(12) United States Patent
Nilsson et al.

(10) Patent No.: US 12,484,494 B2
(45) Date of Patent: Dec. 2, 2025

(54) FORESTRY SYSTEM

(71) Applicant: KOMATSU FOREST AB, Umeå (SE)

(72) Inventors: Erik Nilsson, Obbola (SE); Peter Assarsson, Umeå (SE)

(73) Assignee: KOMATSU FOREST AB, Umeå (SE)

( * ) Notice: Subject to any disclaimer, the term of this patent is extended or adjusted under 35 U.S.C. 154(b) by 61 days.

(21) Appl. No.: 18/702,923

(22) PCT Filed: Oct. 18, 2022

(86) PCT No.: PCT/EP2022/078965
§ 371 (c)(1),
(2) Date: Apr. 19, 2024

(87) PCT Pub. No.: WO2023/066930
PCT Pub. Date: Apr. 27, 2023

(65) Prior Publication Data
US 2025/0063998 A1    Feb. 27, 2025

(30) Foreign Application Priority Data
Oct. 21, 2021    (SE) .................................. 2151280-1

(51) Int. Cl.
*A01G 23/00* (2006.01)
*B60L 50/60* (2019.01)
(Continued)

(52) U.S. Cl.
CPC ............ *A01G 23/006* (2013.01); *B60L 50/60* (2019.02); *B60L 53/10* (2019.02); *B60L 58/12* (2019.02);
(Continued)

(58) Field of Classification Search
CPC ....... A01G 23/006; B60L 50/60; B60L 58/12; B60L 53/10; B64U 50/34; G05D 1/69; B60P 3/41; G06Q 50/02
See application file for complete search history.

(56) References Cited

U.S. PATENT DOCUMENTS

| 8,556,008 B2 | 10/2013 | Einola et al. |
| 2017/0361721 A1 | 12/2017 | Prunty et al. |
| 2023/0294524 A1* | 9/2023 | Wright ...................... B60L 7/26 |
| | | 702/22 |

FOREIGN PATENT DOCUMENTS

| CZ | 2019565 | 4/2021 |
| WO | 2008097146 | 8/2008 |

OTHER PUBLICATIONS

International Search Report and Written Opinion for International PCT Patent Application No. PCT/EP2022/078965 mailed Feb. 20, 2023 (8 pages).

* cited by examiner

*Primary Examiner* — Ramsey Refai
(74) *Attorney, Agent, or Firm* — Fox Rothschild LLP; Carol E. Thorstad-Forsyth

(57) ABSTRACT

The disclosure relates to a forestry system (1). The forestry system comprises a harvester (10) comprising an electrical energy generator, and a plurality of self-driving shuttles (20a-f) for transporting logs harvested by the harvester. Each shuttle comprises an electrical energy storage and at least one electrical motor powered by the electrical energy storage. The electrical energy storage of said shuttle is configured to be coupled to the electrical energy generator and charged thereby. The harvester is configured to load a harvested log onto a coupled shuttle and charge the electrical energy storage of said coupled shuttle using electrical energy from the electrical energy generator.

15 Claims, 2 Drawing Sheets

(51) Int. Cl.
  *B60L 53/10* (2019.01)
  *B60L 58/12* (2019.01)
  *B60P 3/41* (2006.01)
  *B64U 50/34* (2023.01)
  *G05D 1/69* (2024.01)
  *G06Q 50/02* (2012.01)
  *B64U 101/31* (2023.01)
  *G05D 105/15* (2024.01)
  *G05D 105/28* (2024.01)
  *G05D 107/20* (2024.01)
  *G05D 109/10* (2024.01)
  *G05D 109/20* (2024.01)

(52) U.S. Cl.
  CPC ................ *B60P 3/41* (2013.01); *B64U 50/34* (2023.01); *G05D 1/69* (2024.01); *G06Q 50/02* (2013.01); *B60L 2200/40* (2013.01); *B64U 2101/31* (2023.01); *B64U 2201/20* (2023.01); *G05D 2105/15* (2024.01); *G05D 2105/28* (2024.01); *G05D 2107/22* (2024.01); *G05D 2109/10* (2024.01); *G05D 2109/20* (2024.01)

FORESTRY SYSTEM

CROSS REFERENCE TO RELATED APPLICATIONS

This application is a U.S. National Phase Application of PCT International Application No. PCT/EP2022/078965, filed on Oct. 18, 2022, which is an International Application of and claims the benefit of priority to Swedish Patent Application No. 2151280-1, filed on Oct. 21, 2021. The entire contents of these Patent Applications are herein incorporated by reference.

FIELD OF THE INVENTION

The present invention relates to the fields of forestry and forest harvesting. More specifically, the disclosure relates to a forestry system.

BACKGROUND ART

Forestry, and forest/wood harvesting, currently uses machinery, such as harvesters and forwarders, within a forest in order to harvest and transport wood within and from the forest. Such machinery are commonly driven using internal combustion engines which causes environmental impact due to the release of greenhouse gases when being used. Further, such machinery are heavy, especially when loaded with harvested logs, and may consequently damage the soil of the forest.

Thus, within the field of forestry, there is an interest in reducing the environmental impact, such as reducing fuel consumption and/or minimizing soil damage.

SUMMARY

It is an object to mitigate, alleviate or eliminate the above-identified deficiency in the art singly or in any combination and solve at least the above-mentioned problem.

According to a first aspect there is provided a forestry system. The forestry system comprises a harvester comprising an electrical energy generator, and a plurality of self-driving shuttles for transporting logs harvested by the harvester. Each shuttle comprises an electrical energy storage and at least one electrical motor powered by the electrical energy storage. The electrical energy storage of the shuttle is configured to be coupled to the electrical energy generator and charged thereby. The harvester is configured to load a harvested log onto a coupled shuttle and charge the electrical energy storage of the coupled shuttle using electrical energy from the electrical energy generator.

The present disclosure is based on the concept of being able to use a harvester to load harvested logs directly onto a coupled shuttle of a plurality of self-driving shuttles and to charge said coupled shuttle. This concept provides multiple advantages to the prior art, which commonly uses a harvester which harvests logs and places them on the ground, and where the harvested logs are then picked up again by a forwarder which loads the harvested logs onto itself. Firstly, the energy usage is reduced due to loading the harvested logs directly from the harvester to a coupled shuttle, instead of first placing the logs on the ground and then loading the forwarder. Further, by using a plurality of self-driving shuttles instead of a forwarder, each shuttle is able to take a smaller load of harvested logs than a forwarder would, thereby reducing the environmental impact, i.e. soil damage. In other words, the load may be spread between a plurality of shuttles, while still be able to shuttle the same amount of load, when compared to a single forwarder. Additionally, a forwarder is a heavy piece of machinery, in comparison to a self-driving shuttle, and the soil damage is thereby further reduced by using self-driving shuttles. The plurality of self-driving shuttles using electrical motors further reduces the environmental impact, due to no exhaust gases, and increases the efficiency of transporting harvested logs when compared to using internal combustion engines. Further, the use of electrical motors and electrical energy storages allows for charging the shuttles at the harvester. By being able to charge a shuttle each time it is coupled to a harvester for loading of logs, the size of the electrical energy storage of the shuttle may be reduced, thereby reducing the empty weight of the shuttle which reduces the soil damage and/or increases the load capacity of the shuttle. Charging of a coupled shuttle further allows for a longer duration of operation of the shuttle before the electrical energy storage runs out, thereby increasing the potential uptime of the system which may increase the efficiency of the system.

The harvester may be a heavy forestry vehicle. The harvester may be configured for felling, delimbing and/or bucking trees in order to produce harvested logs. The harvester may comprise a traction arrangement configured to drive the harvester. The harvester may comprise an articulated boom to which a processing head may be connected. The harvester may be configured to load a harvested log directly onto a shuttle, i.e. without placing the log on the ground. The harvester may comprise a cab for an operator. However, the harvester may not comprise a cab and may be configured to be remotely operated. The harvester may further comprise a fuel reservoir and an electrical energy generator fueled by a fuel from the fuel reservoir. The electrical energy generator of the harvester may comprise an internal combustion engine.

The self-driving shuttles may each comprise a traction arrangement connected to the at least one electrical motor of said shuttle. The self-driving shuttle may be configured to transport the harvested logs to one or more unloading locations. An unloading location may be a location from which the harvested logs are loaded onto, for example, trucks. The self-driving shuttles may be configured to drive along a driving path, wherein a driving path may include the harvester and an unloading location. Each of the self-driving shuttles may comprise a compartment configured for receiving harvested logs. By the term "self-driving" it is further meant, for example, driverless or autonomous. The self-driving shuttles may be configured to follow a harvester when coupled to the harvester. Thus, a coupled self-driving shuttle may be configured to maintain the coupling by following the harvester. Alternatively, the self-driving shuttles may be remotely operated.

By the term "electrical energy storage", it is further meant, for example, a battery, wherein the battery may be configured as, for example, a lithium-ion battery or a lithium polymer battery or a lithium iron phosphate battery.

The harvester may be configured to load said harvested logs onto said coupled shuttle at a same time as charging the electrical energy storage of said coupled shuttle. Thus, by being able to load and to charge a coupled shuttle at the same time, the efficiency of the system may be increased.

The forestry system may be configured to charge said coupled shuttle by a charging amount. Thus, the system may allow for making sure that the coupled shuttle is charged with a required level of electrical energy. The system may allow for charging the coupled shuttle with a charging amount such that the coupled shuttle may be able to operate during the remainder of the operation, i.e. working day or shift. The electrical energy generator may be configured for delivering enough electrical energy to operate the harvester and to charge a coupled shuttle. In other words, an electrical delivery capacity of the electrical energy generator may be enough to operate the harvester and to charge a coupled shuttle.

For example, a shuttle may start a working day with a fully charged electrical energy storage. The shuttle may be expected to drive, for example, ten trips between the harvester and an unloading location during the working day. However, the capacity of the electrical energy storage may only be enough for, for example, five trips. Hence, the shuttle, in this example, needs twice the amount of electrical energy as the capacity of the electrical energy storage. Thus, the shuttle needs to be charged, on average, one tenth of its electrical energy storage's capacity during the ten times that it is coupled to the harvester, such that it receives the needed electrical energy in order to be able to operate during the whole working day.

Correspondingly, the system may allow for making sure that the coupled shuttle is not being charged more than is required. Charging one coupled shuttle more than is required may lead to another shuttle not being able to be charged enough later, or may cause unnecessary waiting time, which may reduce the efficiency of the system.

The charging amount may be determined based on at least one of: a distance from the harvester to an unloading location, a determined, or estimated, electrical energy usage of a shuttle corresponding to a round trip between the harvester and the unloading location, an electrical energy level of the electrical energy storage of said coupled shuttle, one or more electrical energy levels of the electrical energy storages of one or more other shuttles of the plurality of self-driving shuttles, an expected amount of remaining driving of said coupled shuttle, an expected amount of electrical energy usage by said coupled shuttle, and a determined load, i.e. weight, of harvested logs on said coupled shuttle. Thus, the system may optimise the charging of the shuttles, thereby increasing the efficiency of the system.

The electrical energy usage of a shuttle corresponding to a round trip between the harvester and the unloading location may correspond to the electrical energy usage along a driving path from the harvester to the unloading location and the electrical energy usage along a driving path from the unloading location to the harvester. The expected amount of remaining driving of said coupled shuttle may correspond an expected remaining number of round trips for said coupled shuttle. The expected amount of electrical energy usage by said coupled shuttle may be based on the expected amount of remaining number of round trips for said coupled shuttle times the determined, or estimated, electrical energy usage of said shuttle corresponding to a round trip.

The forestry system may be configured for data communication between the harvester and the plurality of self-driving shuttles. The harvester and the plurality of self-driving shuttles may comprise communication devices configured for, for example, WiFi-, 3G-, LTE-, 4G-, and/or 5G-communication. The communication devices may further be configured for satellite navigation, such as, a global navigation satellite system, GNSS, and may be configured to communicate location data, such as locations and/or paths.

The data communication may comprise at least one of: an electrical energy level of an electrical energy storage of a shuttle, a log load level of a shuttle, a driving path for a shuttle, a location of a shuttle, a location of the harvester, and a location of an unloading location. The data communication may further comprise a distance from the harvester to an unloading location, a determined, or estimated, electrical energy usage of a shuttle corresponding to a round trip between the harvester and the unloading location, an expected amount of remaining driving of a shuttle, an Estimated Time of Arrival, ETA, an expected amount of electrical energy usage of a shuttle. The data communication may allow for an increased optimisation of charging, driving and/or loading of the shuttles, thereby increasing the efficiency of the system.

The data communication further allows for the system to operate in either a centralized mode or in a distributed mode. In the centralized mode, the harvester may be configured to communicate data to the shuttles. In other words, the harvester and the shuttles may be arranged in a master-slave configuration, in which the harvester informs and instructs the shuttles. In the distributed mode, each shuttle may be configured to communicate data regarding itself to the harvester.

The forestry system may further comprise one or more unmanned aerial vehicles, UAVs. The UAVs may be configured to generate an image of a forestry scene in a neighbourhood of the harvester and/or one or more of the plurality of self-driving shuttles. The system may be configured to determine a driving path for one or more of the plurality of self-driving shuttles based at least in part on the image of the forestry scene. The UAVs may further be configured to collect lidar data, topography data, and/or weather data.

The one or more UAVs may comprise: an electrical energy storage and at least one electrical motor powered by said electrical energy storage. The electrical energy storage of the one or more UAVs may be configured to be coupled to the electrical energy generator of the harvester and charged thereby. The harvester may comprise a charging dock configured for electrically connecting the electrical energy generator to a UAV and to charge the UAV thereby. Thus, the one or more UAVs may be operated in the neighbourhood of the harvester continuously.

The forestry system may be further configured for data communication between the harvester, the plurality of self-driving shuttles and the one or more UAVs. The data communication may further comprise at least one of: an electrical energy level of an electrical energy storage of a UAV, and a location of a UAV. The data communication may further comprise one or more images of a forestry scene. The system may be configured to determine, or select, one or more driving path(s) based on the image(s) of the forestry scene.

The forestry system may further comprise a self-driving unloading crane configured to unload logs from a shuttle. The unloading crane be configured as, for example, a log loader or a crane grapple. The unloading crane may comprise an electrical energy storage and at least one electrical motor powered by said electrical energy storage. The electrical energy storage of the unloading crane may be configured to be coupled to the electrical energy generator of the harvester, or an electrical energy storage of a shuttle, and to exchange electrical energy thereby. Thus, the unloading crane may be configured to be charged by a coupled shuttle, which increases the availability of the unloading crane, thereby increasing the efficiency of the system. Correspondingly, the unloading crane may be configured to charge a coupled shuttle, which may reduce future required charging of said shuttle by the harvester, which may increase the efficiency of the system.

The unloading crane may further comprise a fuel reservoir and an electrical energy generator fueled by a fuel from the fuel reservoir. The electrical energy generator may comprise an internal combustion engine or a fuel cell.

The unloading crane may comprise a cab for an operator and be configured for being operated by an operator operating inside the cab. Alternatively, the unloading crane may be configured to be remotely controlled by an operator. According to another alternative embodiment, the unloading crane may be self-driving.

The forestry system may be further configured for data communication between the harvester, the plurality of self-driving shuttles and the self-driving unloading crane. The data communication may further comprise at least one of: an electrical energy level of an electrical energy storage of the unloading crane, and a location of the unloading crane. Thus, the system may allow for, for example, determining driving paths between the harvester and unloading crane, optimising charging of the shuttles and/or the unloading crane, thereby increasing the efficiency of the system.

Each shuttle may further comprise a first electrical coupling configured for coupling the electrical energy storage to the electrical energy generator.

Each shuttle may further comprise a second electrical coupling configured for coupling to another shuttle of the plurality of self-driving shuttles. The other shuttle may be configured to receive electrical energy via the second electrical coupling. A second shuttle may receive electrical energy from the electrical energy storage of a first shuttle. Alternatively, the second shuttle may receive electrical energy from the harvester, via the first shuttle which is coupled to the harvester. In other words, the electrical couplings allow for charging of multiple shuttles, thereby increasing the efficiency of the system.

For example, a first shuttle may be coupled to the harvester and is being loaded with harvested logs, while a second shuttle may arrive to the harvester. The second shuttle may be able to couple to the first shuttle and to be charged while the first shuttle is being loaded. Thus, the time spent by the second shuttle while waiting to be loaded is utilised, thereby increasing the efficiency of the system.

The first and the second electrical couplings of a shuttle may be substantially identical. However, one of the first and second electrical couplings may be male coupling and the other of the first and second electrical couplings may be a female coupling. The first and the second electrical couplings of a shuttle may be arranged on opposite ends of the shuttle, wherein one of the first and second electrical couplings may be arranged at a front end of the shuttle, and the other of the first and second electrical couplings may be arranged at a rear end of the shuttle. By the term "coupling", it is further meant, for example, connector or link. It is to be understood that present disclosure is not limited to two shuttles being coupled to each other, and that substantially any number of shuttles may be connected to each other, thereby being arranged in a train configuration, or in a daisy chain configuration. Thus, a plurality of shuttles may be charged simultaneously when the plurality of shuttles are arranged in a train, or daisy chain, configuration.

Each shuttle may further comprise a mechanical connector for mechanically connecting said shuttle to the harvester or another shuttle of the plurality of self-driving shuttles. Each shuttle may comprise two mechanical connectors, wherein each mechanical connector is arranged at opposite ends of the shuttle, wherein one mechanical connector may be arranged at a front end of the shuttle, and the other mechanical connector may be arranged at a rear end of the shuttle. The mechanical connector of a shuttle may be configured to allow for the shuttle to be pulled by the harvester or another shuttle to which it is mechanically connected to via the mechanical connector. Further, additional shuttles may be connected together to form a train, or a chain, of shuttles. The mechanical connector thereby allows for a harvester, or a shuttle, to pull one or more shuttles. In other words, the harvester, or a shuttle, may transport one or more shuttles. For example, the mechanical connector thereby further allows for a harvester to transport one or more shuttles between different work sites. Thus, the mechanical connector may increase operational flexibility of the system, which may increase the efficiency of the system.

The mechanical connector and the first electrical coupling may form part of a same coupling arrangement. A shuttle may further comprise an additional mechanical connector which together with the second electrical coupling forms a same additional coupling arrangement. By providing a coupling arrangement, the coupling to the electrical energy storage of a shuttle may be more robust, which may reduce the risk of the disconnection. The coupling arrangement may further protect the electrical coupling.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The invention will by way of example be described in more detail with reference to the appended schematic drawings, which show presently preferred embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
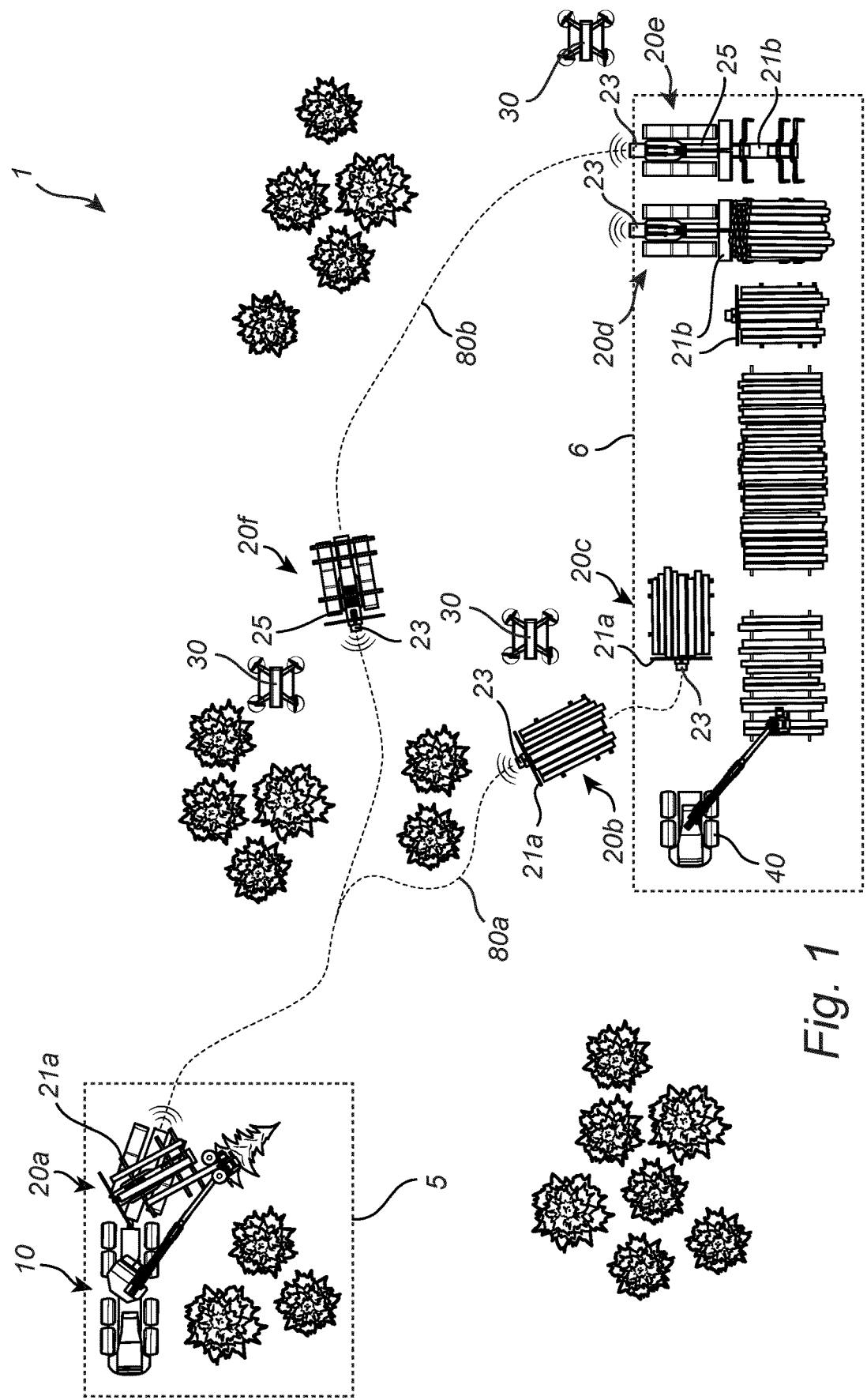
FIG. 1 shows a top view of a forestry system according to an embodiment of the present disclosure in a forest environment.

FIG. 1 shows a forestry system 1 in a forest environment. The forestry system 1 comprises a harvester 10 comprising an electrical energy generator, and six self-driving shuttles 20a-f for transporting logs harvested by the harvester 10. The system 1 is not limited to comprising six self-driving shuttles 20a-f and may comprise any number of self-driving shuttles 20a-f, such as, for example, two, three, four, five, six, or more. Further, the system 1 may comprise one or more additional harvesters (not shown), which may be operated at different work sites in the forest environment. Each shuttle 20a-f comprises an electrical energy storage and at least one electrical motor powered by the electrical energy storage, wherein the electrical energy storage of said shuttle 20a-20f is configured to be coupled to the electrical energy generator of the harvester 10 and charged thereby. The harvester 10 is configured to load a harvested log onto a coupled shuttle 20a-20f and charge the electrical energy storage of said coupled shuttle 20a-20f using electrical energy from the electrical energy generator.

The shown forestry system 1 further comprises an unloading crane 40 configured to unload logs from a shuttle 20a-f. The unloading crane 40 comprises an electrical energy storage and at least one electrical motor powered by said electrical energy storage. The electrical energy storage of the unloading crane 40 is configured to be coupled to the electrical energy generator of the harvester 10, or an electrical energy storage of a shuttle 20a-f, and to exchange electrical energy thereby.

The harvester 10 is currently situated a work site 5, which may also be termed a logging area. A shuttle 20a of the plurality of self-driving shuttles 20a-f is currently coupled to the harvester. The harvester 10 is currently delimbing a tree which it has felled and is preparing to buck the tree and load it onto the coupled shuttle 20a. The coupled shuttle 20a comprises a compartment 21a for receiving logs. The compartment 21a of the shuttle 20a is positionable. The compartment 21a of the shuttle 10a has been rotated to allow for easier loading of harvested logs by the harvester 10. The easier loading may comprise a reduced required lift and/or travel of the harvested logs, which may increase the efficiency of the system 1. However, the shuttles 20a-f are not limited to comprising positionable compartments 21a, and may, for example, comprise non-positionable compartments 21a. The electrical energy storage of the coupled shuttle 20a may be charged by the electrical energy generator of the harvester 10 during the loading of harvested logs.

When the shuttle 20a is fully loaded, it may decouple from the harvester 10, and drive from the harvester 10, along a driving path 80a, to an unloading location 6, which may also be termed a log landing area, in order to be unloaded.

Another shuttle 20b of the plurality of self-driving shuttles 20a-f, which is fully loaded, i.e. the compartment 21b of the shuttle 20b is fully loaded, with harvested logs is currently driving along the driving path 80a towards the unloading location 6. The system 1 may be configured to make sure that the shuttle 20b has been charged enough by the harvester 10 to be able to drive to the unloading location 6 and back to the work site 5, thereby allowing for a continuous operation of the shuttle 20b.

Yet another shuttle 20c is currently at the unloading location 6 and is being unloaded by the unloading crane 40. If either of the shuttle 20c or unloading crane 40 would need additional electrical energy they could be coupled together and exchange electrical energy thereby, which increases the potential for a continuous operation of the system 1. The unloading crane 40 may further comprise a fuel reservoir and an electrical energy generator fueled by a fuel from the fuel reservoir, wherein the electrical energy generator may comprise an internal combustion engine or a fuel cell. Thus, the unloading crane 40 may be configured to generate electrical energy.

The three additional shuttles 20d-f of the plurality of self-driving shuttles 20a-f are configured for using removable compartments 21b, which may alternatively be termed cassettes or containers, configured for receiving harvested logs. Each shuttle 20d-f of the three additional shuttles 20d-f further comprises a hook lift 25 configured for lifting a removable compartment 21b down from the shuttle 20d-f, or for lifting an empty removable compartment 21b up onto the shuttle 20d-f. By using shuttles 20d-f configured for using removable compartments 21b, a shuttle 20d-f may be able to drive to the unloading location 6 with a fully loaded removable compartment 21b, lift the fully loaded removable compartment 21b down from itself, lift an empty removable compartment 21b up onto itself and drive back to the work site 5. Thus, the time at the unloading location 6 for a shuttle 20d-f may be reduced, thereby increasing the efficiency of the system 1. It is to be understood that present disclosure is not limited to comprising shuttles 20a-f configured, or not configured, for removable compartments 21b. In other words, the present disclosure may allow for using only shuttles 20d-f configured for removable compartments 21b, using only shuttles 20a-c not configured for removable containers 21a, or using both kinds of shuttles 20a-20f.

A shuttle 20d configured for using a removable compartment 21b is currently lifting a fully loaded removable compartment 21b down from itself. In other words, the shuttle 20d is unloading the removable compartment 21b. Yet another shuttle 20e configured using a removable compartment 21b is currently lifting up an empty removable compartment 21b onto itself. In other words, the shuttle 20e is picking up an empty removable compartment 21b. A third shuttle 20f configured for using a removable compartment 21b is currently driving along a second driving path 80b from the unloading location 6 to the work site 5 with an empty compartment 21b.

Each of the shuttles 20a-f may comprise a first electrical coupling 23 configured for coupling the electrical energy storage of the shuttle 20a-f to the harvester 10, the unloading crane 40 or another shuttle 20a-f.

The shuttle 20f may reach the work site 5 before the harvester 10 has finished loading the shuttle 20a coupled to the harvester 10, wherein the electrical energy storage of the coupled shuttle 20a may be coupled to the electrical energy generator of the harvester 10 via the first electrical coupling (not shown) of the coupled shuttle 20a. The shuttles 20a-f may each comprise a second electrical coupling (not shown; see FIG. 2) configured for coupling to another shuttle 20a-f, via the first electrical coupling 23 or the second electrical coupling of the other shuttle 20a-f, and wherein the two coupled shuttles 20a-f may thereby be configured to exchange electrical energy. Thus, the shuttle 20f with the empty compartment 21b may be configured to couple to the shuttle 20a coupled to harvester 10 and be charged thereby.

The shown forestry system 1 further comprises three unmanned aerial vehicles, UAVs, 30 configured to generate an image of a forestry scene in a neighbourhood of the harvester 10 and/or one or more of the plurality of self-driving shuttles 20a-f. The system 1 may be configured to determine a driving path 80a, b for one or more of the plurality of self-driving shuttles 20a-20f based on the image (s) of the forestry scene. The system 1 may be configured to determine additional driving paths (not shown) for the shuttles 20*a-f* based on the image(s) of the forestry scene.

Figure 2:
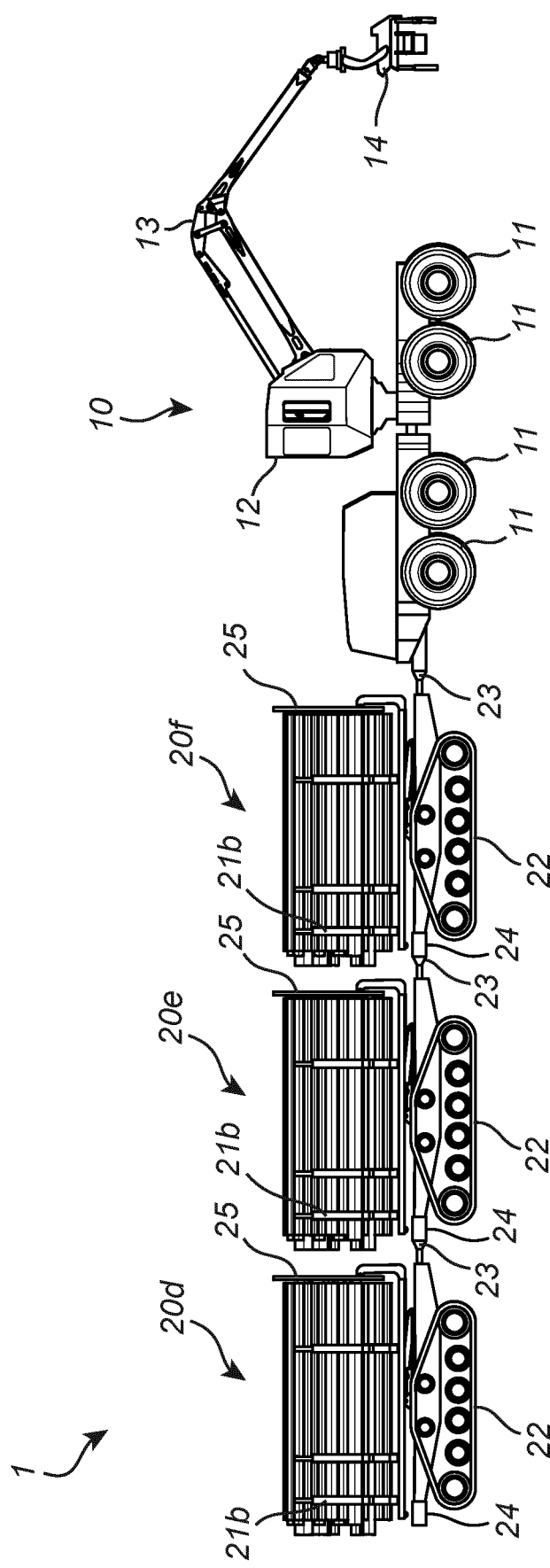
FIG. 2 shows a side view of a harvester and three self-driving shuttles of a forestry system according to an embodiment of the present disclosure.

FIG. 2 shows a side view of a harvester 10 and three self-driving shuttles 20*d-f* of a forestry system 1 according to an embodiment of the present disclosure.

The shown harvester 10 comprises a cab 12 for an operator and an articulated boom 13 to which a processing head 14 is connected. The harvester 10 further comprises a traction arrangement 11 comprising six wheels, wherein three of the wheels are shown in FIG. 2. The traction arrangement 11 may alternatively comprise continuous tracks or a combination of continuous tracks and wheels. The cab 12 and the articulated boom 13 are both facing a forward direction of the harvester 10.

Each of the three shuttles 20*d-f* comprises a compartment 21*b* which is loaded with harvested logs. Each shuttle 20*d-f* further comprises a traction arrangement 22 configured for driving said shuttle 20*d-f*. Further, each shuttle 20*d-f* comprises a coupling arrangement 23. Each coupling arrangement 23 of a shuttle 20*d-f* comprises a mechanical connector for mechanically connecting the shuttle to the harvester 10 or another shuttle 20*d-f* and a first electrical coupling configured for electrically coupling electrical energy storage of the shuttle 20*d-f* to the harvester 10 or to a second electrical coupling 24 of another shuttle 20*d-f*. The three shuttles 20*d-f* are coupled together via their respective coupling arrangements 23. The coupling arrangements 23 may allow for the harvester 10 to pull the shuttles 20*d-f*. For example, the harvester 10 may pull the shuttles 20*d-f* along (public) roads, thereby allowing for moving the system 1 between, for example, different work sites.

It is to be understood that the first and second electrical couplings 24 may be configured similarly, or substantially identically. Thus, a shuttle 20*d-f* may be pulled by a harvester 10 or another shuttle 20*d-f* regardless of which end of the shuttle 20*d-f* that is coupled to the harvester 10 or other shuttle 20*d-f*. In other words, a shuttle 20*d-f* may be pulled, and driven, in both directions.

Further, the shuttles 20*d-f* may be charged by the harvester 10 whilst being coupled together. Furthermore, the shuttles 20*d-f* may be configured to exchange electrical energy between each other. Thus, the system 1 may allow for making sure that any of the shuttles 20*d-f* is being charged.

The person skilled in the art realizes that the present disclosure by no means is limited to the preferred embodiments described above. On the contrary, many modifications and variations are possible within the scope of the appended claims. For example, the harvester 10 may be using a fuel cell to generate electrical energy, and the harvester 10 and/or the self-driving shuttles 20*a-f*, etc., may have different shapes, dimensions and/or sizes than those depicted/described.

The invention claimed is:

1. A forestry system (1), comprising,
   a harvester (10) comprising an electrical energy generator, and
   a plurality of self-driving shuttles (20*a-f*) for transporting logs harvested by the harvester (10),
   wherein each shuttle (20*a-f*) comprises an electrical energy storage and at least one electrical motor powered by the electrical energy storage, wherein the electrical energy storage of said shuttle (20*a-f*) is configured to be coupled to the electrical energy generator and charged thereby, and
   wherein the harvester (10) is configured to load a harvested log onto a coupled shuttle (20*a-f*), and charge the electrical energy storage of said coupled shuttle (20*a-f*) using electrical energy from the electrical energy generator.

2. The forestry system (1) according to claim 1,
   wherein the harvester (10) is configured to load said harvested log onto said coupled shuttle (20*a-f*) at a same time as charging the electrical energy storage of said coupled shuttle (20*a-f*).

3. The forestry system (1) according to claim 1, wherein the system is configured to:
   charge said coupled shuttle (20*a-f*) by a charging amount.

4. The forestry system (1) according to claim 3, wherein the charging amount is determined based on at least one of:
   a distance from the harvester (10) to an unloading location (6);
   a determined electrical energy usage of a shuttle (20*a-f*) corresponding to a round trip between the harvester (10) and the unloading location (6);
   an electrical energy level of the electrical energy storage of said coupled shuttle (20*a-f*);
   one or more electrical energy levels of the electrical energy storages of one or more other shuttles (20*a-f*) of the plurality of self-driving shuttles (20*a-f*);
   an expected amount of remaining driving of said coupled shuttle (20*a-f*);
   an expected amount of electrical energy usage by said coupled shuttle (20*a-f*); and
   a determined load of harvested logs on said coupled shuttle (20*a-f*).

5. The forestry system (1) according to claim 1, wherein:
   the system is configured for data communication between the harvester (10) and the plurality of self-driving shuttles (20*a-f*).

6. The forestry system (1) according to claim 5, wherein the data communication comprises at least one of:
   an electrical energy level of an electrical energy storage of a shuttle (20*a-f*);
   a log load level of a shuttle (20*a-f*);
   a driving path (80) for a shuttle (20*a-f*);
   a location of a shuttle (20*a-f*);
   a location of the harvester (10); and
   a location of an unloading location (6).

7. The forestry system (1) according to claim 1, further comprising:
   one or more unmanned aerial vehicles, UAVs, (30) configured to generate an image of a forestry scene in a neighbourhood of the harvester (10) and/or one or more of the plurality of self-driving shuttles (20*a-f*);
   wherein the system is configured to determine a driving path (80*a, b*) for one or more of the plurality of self-driving shuttles (20*a-f*) based on the image of the forestry scene.

8. The forestry system according to claim 7, wherein the one or more UAVs (30) comprise:
   an electrical energy storage and at least one electrical motor powered by said electrical energy storage,
   wherein the electrical energy storage of the one or more UAVs (30) is configured to be coupled to the electrical energy generator of the harvester (10) and charged thereby.

9. The forestry system (1) according to claim 7, wherein the system is further configured for data communication between the harvester (10), the plurality of self-driving shuttles (20*a-f*) and the one or more UAVs (30), wherein the data communication further comprises at least one of:

an electrical energy level of an electrical energy storage of a UAV (30);

a location of a UAV (30).

10. The forestry system (1) according to claim 1, further comprising;

an unloading crane (40) configured to unload logs from a shuttle (20*a-f*), wherein the unloading crane (40) comprises an electrical energy storage and at least one electrical motor powered by said electrical energy storage, wherein the electrical energy storage of the unloading crane (40) is configured to be coupled to the electrical energy generator of the harvester (10), or an electrical energy storage of a shuttle (20*a-f*), and to exchange electrical energy thereby.

11. The forestry system (1) according to claim 10, wherein the system is further configured for data communication between the harvester (10), the plurality of self-driving shuttles (20*a-f*) and the unloading crane, wherein the data communication further comprises at least one of:

an electrical energy level of an electrical energy storage of the unloading crane;

a location of the unloading crane (40).

12. The forestry system (1) according to claim 1, wherein each shuttle (20*a-f*) further comprises a first electrical coupling (24) configured for coupling the electrical energy storage to the electrical energy generator.

13. The forestry system (1) according to claim 12, wherein each shuttle (20*a-f*) further comprises a second electrical coupling (24) configured for coupling to another shuttle (20*a-f*) of the plurality of self-driving shuttles (20*a-f*);

wherein the other shuttle (20*a-f*) is configured to receive electrical energy via the second electrical coupling (24).

14. The forestry system (1) according to claim 1, wherein each shuttle (20*a-f*) further comprises a mechanical connector for mechanically connecting said shuttle (20*a-f*) to the harvester (10) or another shuttle (20*a-f*) of the plurality of self-driving shuttles (20*a-f*).

15. The forestry system (1) according to claim 12, wherein the mechanical connector and the first electrical coupling (24) form part of a same coupling arrangement (23).

* * * * *